US006966152B2

(12) United States Patent
Glynos

(10) Patent No.: US 6,966,152 B2
(45) Date of Patent: Nov. 22, 2005

(54) PROTECTIVE TARP WITH PLURAL SEPARATED ANCHORS

(76) Inventor: Peter N. Glynos, 5 Black Oak Trail, Warren, NJ (US) 07059

( * ) Notice: Subject to any disclaimer, the term of this patent is extended or adjusted under 35 U.S.C. 154(b) by 0 days.

(21) Appl. No.: 10/898,801

(22) Filed: Jul. 26, 2004

(65) Prior Publication Data

US 2004/0261325 A1    Dec. 30, 2004

Related U.S. Application Data

(63) Continuation-in-part of application No. 10/057,208, filed on Jan. 25, 2002, now abandoned.

(51) Int. Cl.[7] ................................ E04D 5/00
(52) U.S. Cl. ........................ 52/4; 52/3; 248/910
(58) Field of Search ................ 52/4, 302.1, 302.3, 52/102, 155, 3, 2.13, 2.23; 4/498

(56) References Cited

U.S. PATENT DOCUMENTS

| | | | |
|---|---|---|---|
| 3,862,876 A | 1/1975 | Graves | |
| 4,122,637 A | 10/1978 | Runge et al. | |
| 4,455,790 A | 6/1984 | Curle | |
| 5,176,421 A | 1/1993 | Fasiska | |
| 5,579,794 A | 12/1996 | Sporta | |
| 6,363,661 B1 | 4/2002 | Myers | |
| 6,739,095 B2 * | 5/2004 | Glynos | ............................ 52/4 |

FOREIGN PATENT DOCUMENTS

GB          2206024 A    12/1988

* cited by examiner

*Primary Examiner*—Ramon O Ramirez
(74) *Attorney, Agent, or Firm*—Kenneth P. Glynn

(57) ABSTRACT

A protective tarp for covering a mass includes of a flat, flexible sheet material having a top and a bottom and having a peripheral edge, e.g. a plurality of edges. Along the peripheral edge or along each of at least two of the plurality of edges, there is a plurality of unconnected tank compartment anchors, arranged in a predetermined pattern, that have at least one fill orifice and closure means for the fill orifice. The plurality of tank compartment anchors are hollow, flexible tank compartment anchors, and, in preferred embodiments, the tank compartment anchors and sheet material are formed of the same material. In some embodiments, the sheet material is rectangular from a top view and has four edges, the four edges being two sets of two opposite edges. There are at least two edges opposite one another which contain a plurality of tank compartment anchors.

20 Claims, 3 Drawing Sheets

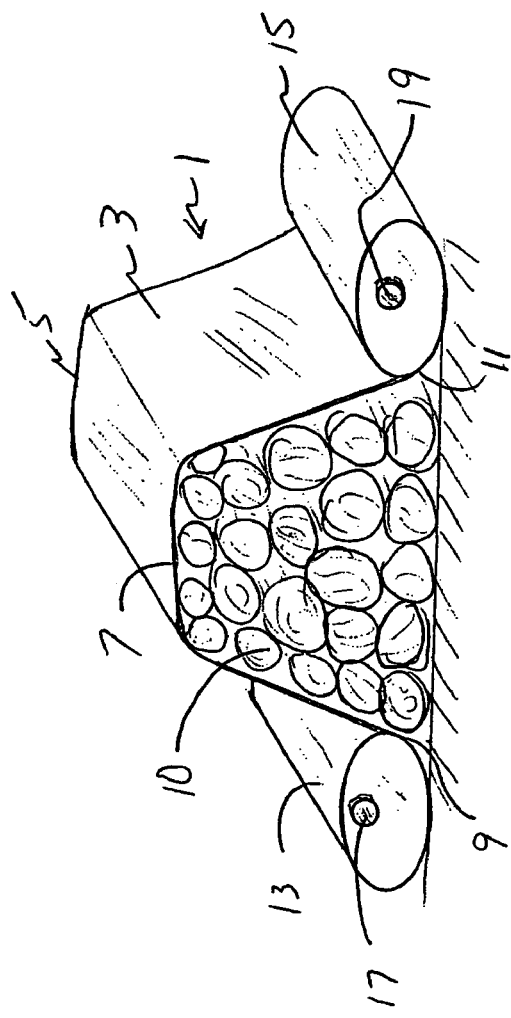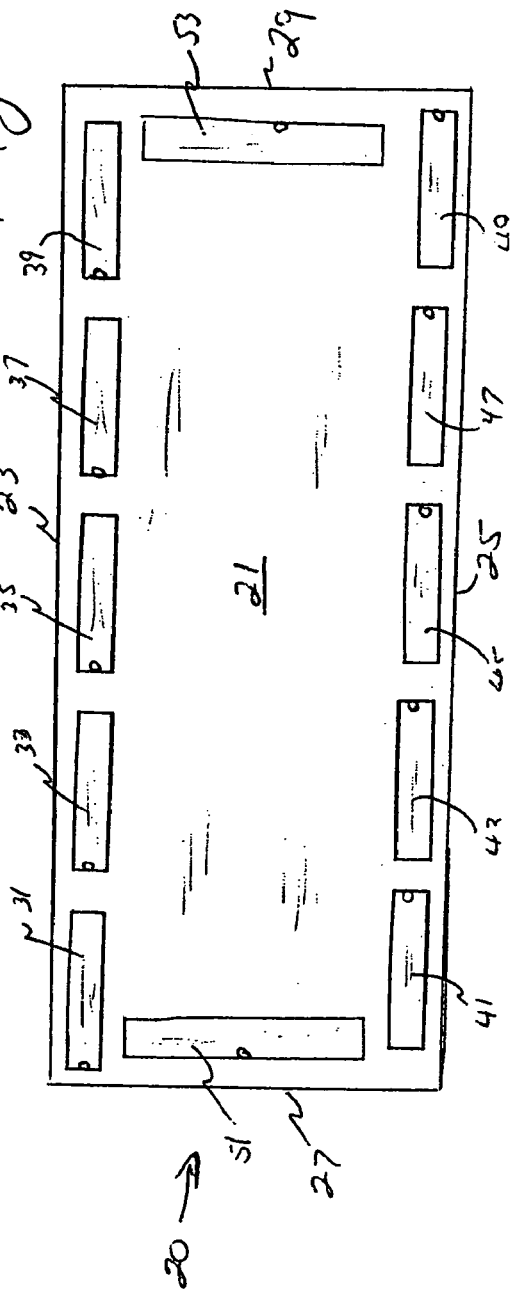

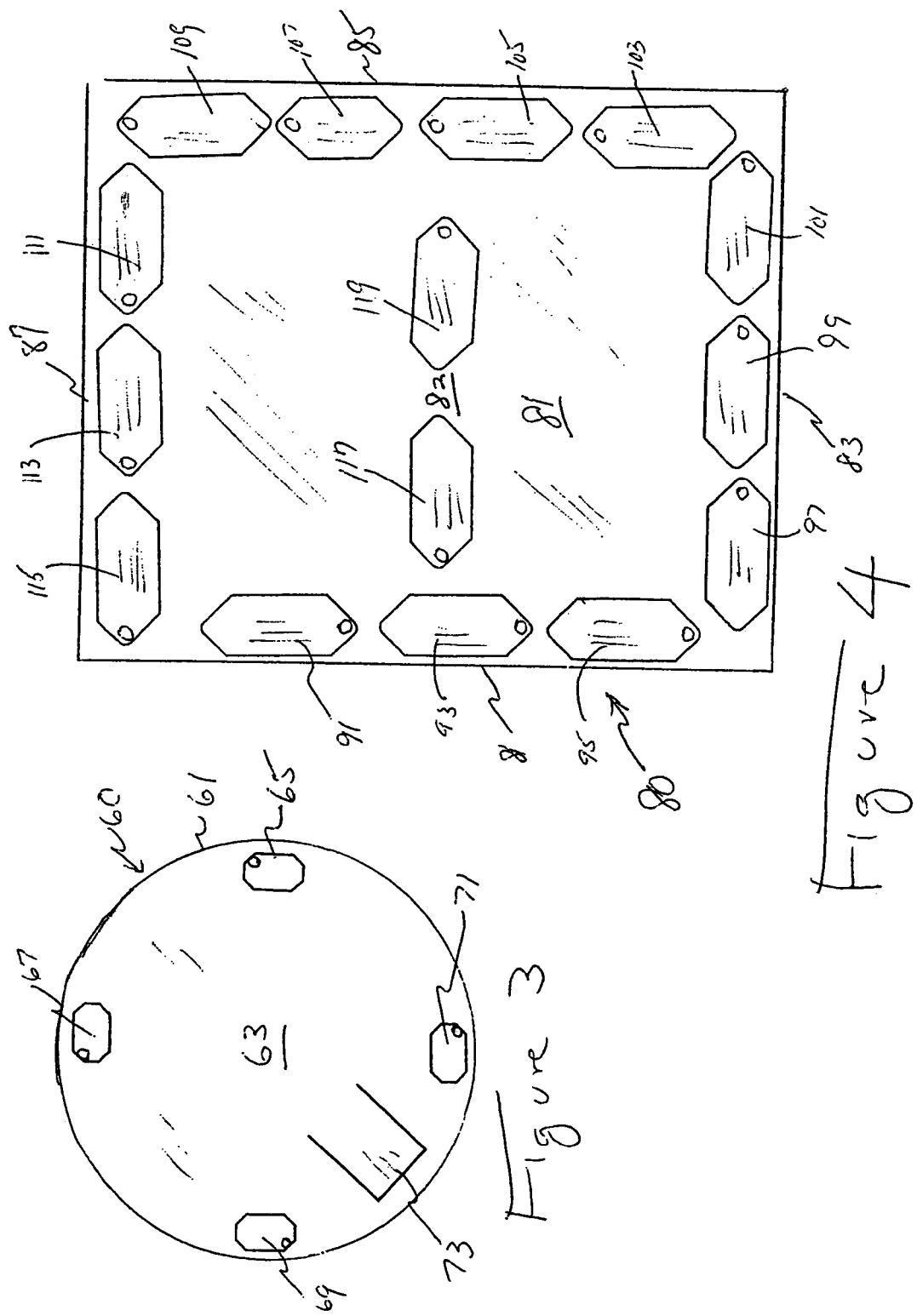

PROTECTIVE TARP WITH PLURAL SEPARATED ANCHORS

REFERENCE TO RELATED CASES

This patent application is a continuation-in-part of U.S. application Ser. No. 10/057,208, filed on Jan. 25, 2002, entitled "Protective Tarp With Anchors", by the same inventor and assignee herein now abandoned.

BACKGROUND OF THE INVENTION

1. Field of the Invention

The present invention relates to protective tarps for covering a mass, especially masses located outdoors. More specifically, it relates to protective tarps with anchors formed of tank compartments, which may be filled with fluent material. In preferred embodiments, the tank compartment anchors are integrally formed with the tarp sheet material.

2. Information Disclosure Statement

The following patents are exemplary of the prior art relating to tarps:

U.S. Pat. No. 3,862,876 describes a protective cover cloth having continuous flexible weights secured along at least two opposed edges for securing the cover against wind blowing, etc. The cover cloth may be made from insulating materials and heated for curing concrete. Sand, shot or other particulate material, possibly in individual bags, is inserted in a wide hem or tubes attached along the edges of the cover.

U.S. Pat. No. 4,122,637 describes a perforate member that is laid over a windrow of cut plants to confine it against the action of the wind. The member is open over a major portion of its area to sunlight and the passage of air. The member is held against the ground preferably by the weight of water in flexible tubes extending along opposite sides of the windrow.

U.S. Pat. No. 4,455,790 describes a tarpaulin anchoring system for retaining a tarpaulin on a pile of stored grain or other granular material that comprises of a plurality of anchors embedded in the pile. Each anchor has an attachment element protruding upwardly from the pile, with the attachment element being connected to a fastener affixed to the underside of the tarpaulin. The anchors are placed in the grain pile, throughout the area covered by the tarpaulin, as required to retain it in place. The anchors themselves may be of a screw or auger type which can be driven into an existing grain pile and attached to a tarpaulin as it is spread over the pile. In the case where a tarp is suspended above a grain storage area prior to formation of the grain pile, the anchors may be discs or plates attached to the underside of the tarpaulin by ropes; the anchors are buried in the pile when formed.

U.S. Pat. No. 5,176,421 describes a cover system for an automobile which includes a flexible cover, preferably of nylon, having leading, tailing and side edge portions and of a suitable dimension to fit over the entire car body from rear bumper to the front bumper and sides thereof. The flexible cover includes an elastic leader segment attached at a first end to the cover and spaced from the trailing edge thereof. A second end of the leader segment is attached to a rotatable spool housed in a containment tube. The spool is rotated for storing in the cover by a motor, by a spring-biased shaft arrangement or by a manually turnable crank or combinations thereof. The containment tube may be pivotally swung outwardly from the trunk to an operable position at the rear of the trunk lid. After the cover is applied to the automobile, the containment tube is swung back to the trunk compartment for safe storage.

U.S. Pat. No. 5,579,794 describes a method for shielding, anchoring and containing an object such as a trailer or motor home in gale-force winds. A wind-permeable perforate sheet extends downwardly and outwardly from the top of the object or the roof of a home at an acute angle so as to surround a substantial portion of each of the sides with an inclined wind-permeable planar surface. The sheet is anchored to helical ground anchors via mechanical attachments which may also be used to tighten the sheet over the object or home. Apparatus for shielding, anchoring and containing an object such as a trailer of motor home in gale-force winds are also disclosed.

U.S. Pat. No. 6,363,661 B1 describes a cover for protecting a mound of particulate material in outside storage from the effects of weather elements that includes a flexible double-ply canvas having a top layer affixed to a bottom layer. The cover includes a plurality of individual bladders disposed between the top and bottom layers of the canvas, the bladders being spaced apart from and parallel to each other. Each bladder is connected to a next adjacent bladder with a flexible conduit. The cover further includes a plurality of inlet conduits coupled to respective bladders for filling selected bladders with water. Pressure-actuated check valves disposed in each flexible conduit between bladders allows water to flow from an upstream bladder into respective downstream bladders. Each bladder includes a discharge conduit for selectively draining each bladder. A plurality of straps and knobs are fixedly attached to the canvas such that the canvas may be folded and secured in a desired configuration when respective bladders do not contain water.

U.K. Patent No. GB 2,206,024 A describes a sheet, e.g. a large plastics sheet covering a silage pit, which is anchored by means of water-filled tubes. Thus, lay-flat tubing from a reel is laid around and across the sheet. All one end of each length is sealed. Water is passed in through the other end, which is then sealed, thus converting each length of tube to a heavy weight serving to anchor the sheet.

Notwithstanding the prior art, the present invention is neither taught nor rendered obvious thereby.

SUMMARY OF THE INVENTION

The present invention is directed to a protective tarp for covering a mass, which includes of a flat, flexible sheet material having a top and a bottom and having a peripheral edge, e.g. a plurality of edges. Along the peripheral edge or along each of at least two of the plurality of edges, there is a plurality of unconnected tank compartment anchors, arranged in a predetermined pattern, that have at least one fill orifice and closure means for the fill orifice. The plurality of tank compartment anchors are hollow, flexible tank compartment anchors, and, in preferred embodiments, the tank compartment anchors and sheet material are formed of the same material. In some embodiments, the sheet material is rectangular from a top view and has four edges, the four edges being two sets of two opposite edges. There are at least two edges opposite one another which contain a plurality of tank compartment anchors.

In other embodiments, the present invention protective tarp is a continuous tarp of substantial predetermined length having a central area away from the edges, and having a plurality of central tank compartment anchors located at the central area. The central tank compartment anchors are preferably aligned in a row at a right angle to an edge.

On yet other embodiments, there is a plurality of groups of central tank compartment anchors, each group being located at the central area at disparate sections. Each group of the plurality of groups of central tank compartment anchors may be located equidistant from one another. At least a portion of the central tank compartment anchors may be arranged in pairs so that the tarp may be cut between the pairs to create multiple tarps with tank compartment anchors along all edges of each of the cut tarps.

BRIEF DESCRIPTION OF THE DRAWINGS

The present invention should be more fully understood when the specification herein is taken in conjunction with the drawings appended hereto wherein:

FIG. 1 illustrates an oblique front view of a present invention protective tarp with anchors;

FIG. 2 illustrates a top view of another embodiment of a present invention protective tarp with unconnected, separate anchors having tanks on all four sides;

FIG. 3 shows a top view of circular present invention protective tarp;

FIG. 4 shows a top view of a present invention protective tarp with anchors on all four sides and across its central portion;

DETAILED DESCRIPTION OF THE PRESENT INVENTION

Figure 5:
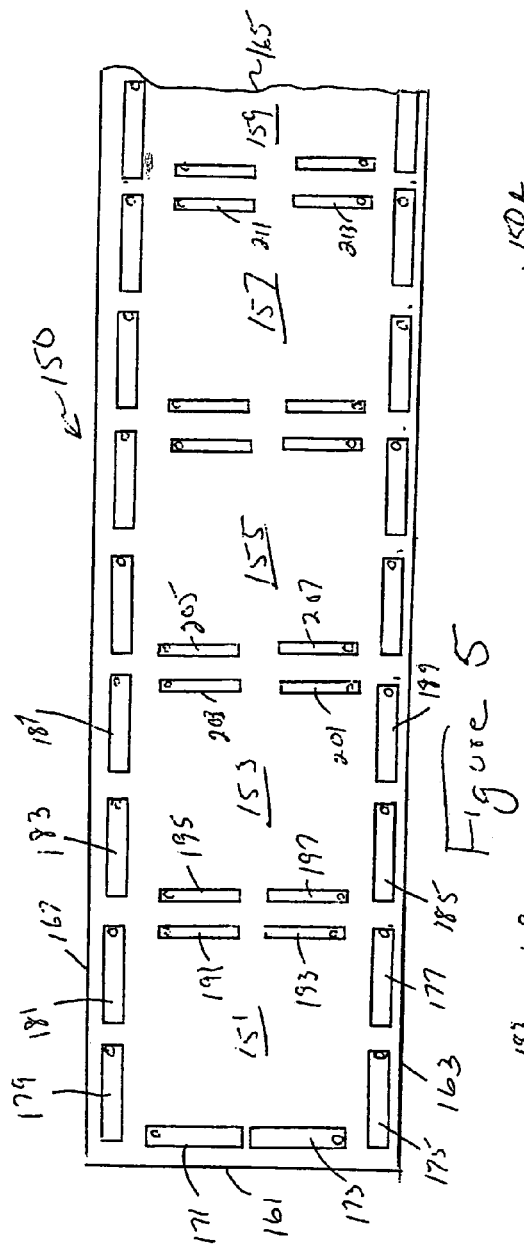
FIG. 5 shows a top view of another embodiment of a present invention protective tarp that has been structured for production in significant lengths so that it may be cut from a dispensing roll to create a variety of tarps of different lengths.

FIG. 1 illustrates a perspective front view of a present invention protective tarp with anchors. Thus, protective tarp 1 has a central portion 3 formed of flexible sheet material and has edges 5, 7, 9, and 11. Edges 5 and 7 form one opposite set of edged and edges 9 and 11 form a second set of opposite edges. At edges 9 and 11 respectively are tank compartment anchors 13 and 15. They each include fill orifices cover by fill caps 17 and 19. These tank compartment anchors 13 and 15 are, in this embodiment, formed of the same flexible sheet material as central portion 3. In this case, both are formed of plastic coated woven material and the anchors are heat welded. The fill orifices are located on sides of the anchors a little distance from the top to assure that when they are filled, there is adequate airspace to accommodate thermal expansion and contraction during freeze and thaw cycles. The anchoring fill material may be any fluent material in liquid or solid form, such as water, sand, propylene glycol or a sand/propylene glycol mixture.

Present invention protective tarp 1 of FIG. 1 is shown to cover a log pile 10 but could be used for covering any mass, such as a motorcycle, lawn furniture, sand piles, swing sets, or outdoor construction projects in progress. While FIG. 1 shows the tank compartment anchors 13 and 15 to run the entire length of edges 9 and 11, this is not required; in many embodiments, there will be a plurality of tank compartment anchors along a single edge.

FIG. 2 shows a present invention protective tarp 20 which has a flat flexible sheet material 21 forming it's central portion and made of flat flexible material and has edges 23, 25, 27, and 29. In this embodiment, there are tank compartment anchors along all four edges so that the tarp may be more close ended. Edge 23 includes tank compartment anchors 31, 33, 35, 37, and 39 while opposite edge 25 includes tank compartment anchors, 41, 43, 45, 47, and 49. Ends 27 and 29 include tank compartment anchors 51 and 53.

While present invention protective tarp 20 of FIG. 2 has a plurality of tank compartment anchors rather than a single continuous tank compartment anchor, for shorter versions single tank compartment anchors along an edge could be used. However, separate small tank compartment anchors are preferred for a number of reasons. Among these reasons:
 the ability to empty one or more compartments to satisfy anchoring requirements for specific applications
 the need to prevent massive fluid weight shifts when the tarp is being moved
 the ability to flatten out, fold, or shorten the functional length of the tarp
 containment and minimization of leaks In FIG. 3, a circular present invention protective tarp 60 is shown. There is a singular, continuous peripheral edge 61 to central portion flexible sheet material 63, as shown. There are four attached tank compartment anchors 65, 67, 69, and 71 located symmetrically around the edge 61 while protective tarp 60 is shown as circular, the flat sheet material 63 could be formed or stitched so as to be conical and to therefore efficiently protect piles of granular material such as road salt or sand. In this particular embodiment, there is also a relatively large, Velcro sealed flap 73, which will enable a user to open the flap and remove the granular material therefrom.

FIG. 4 shows a top view of a generally rectangular present invention top 80. It includes side edges 81, 83, 85, and 87. All of these edges contain a plurality of tank compartment anchors. Thus, edge 81 includes tank compartment anchors 91, 93, and 95; edge 83 contains tank compartment anchors 97, 99, and 101; edge 85 includes tank compartment anchors 103, 105, 107, and 109; edge 87 includes tank compartment anchors 111, 113, and 115. In addition, central portion 81 has a central area 82 with tank compartment anchors 117 and 119. These additional anchors will operate to minimize or eliminate wind lift and air pockets.

FIG. 5 shows a top view of another embodiment of the present invention protective tarp wherein it has been structured for production in significant lengths wherein it may be cut from a dispensing roll to create a variety of tarps of selected lengths.

In FIG. 5, present invention protective tarp 150 has side edges 163 and 167, back edge 161 and cut view front edge 165. In this embodiment, there are a plurality of central areas shown here as central areas 151, 153, 157, and 159. Along side edges 163 and 167 are a plurality of tank compartment anchors symmetrically arranged. These are typified by tank compartment anchors 175, 177, 185, and 189 along side edge 163 and tank compartment anchors 179, 181, 183, and 187 along side 167. Back edge 161 has two tank compartment anchors 171 and 173, as shown. Between each central area are multiple sets of pairs of tank compartment anchors, each of these sets of pairs being grouped equidistantly from one another so as to define the central areas shown.

Figure 7:
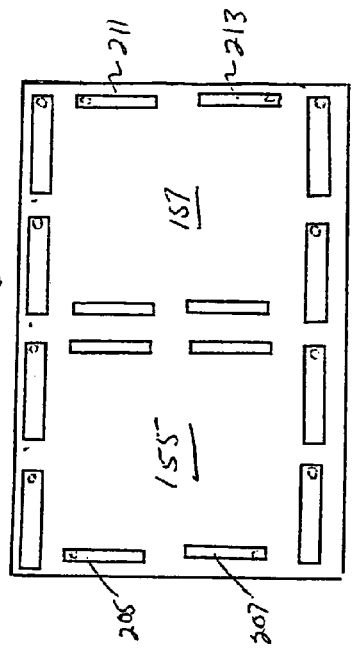
FIGS. 6 and 7 show different tarp segments cut from the elongated tarp shown in FIG. 5, so as to create two different present invention protective tarps.
Figure 6:
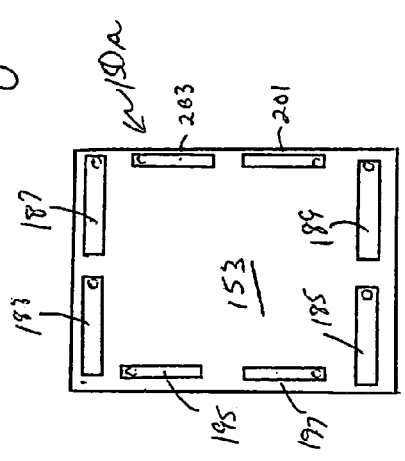

Tarp 150 of FIG. 5 may come in a continuous roll form and may be cut at any point to create a tarp of any desired length. It is preferred to cut tarp 150 at locations between the pairs of tank compartment anchors that separate the various central areas. For example, cuts could be made between tank compartment anchors 191 and 193 to the left and 195 and 197 to the right. Similarly, a cut could be made between tank compartment anchors 201 and 203 on the left and 205 and 207 on the right. Alternatively, a very long tarp could be created by making a cut after tank compartment anchors 211 and 213. FIGS. 6 and 7 show tarp segments 150*a* and 150*b*, respectively, to illustrate preferred segment cuttings from tarp 150 of FIG. 5. With respect to FIGS. 5, 6, and 7, identical parts are identically numbered.

The present invention protective tarp may have its flat, sheet material aspects formed of any known sheet material, including synthetic and natural material, as well as combinations thereof. It may be in the form of mesh or woven material, film material or combinations thereof. It may be very wide meshed, or net-like, or very tightly woven, and it may be water permeable or water proof, but is preferably water proof. The tank compartment anchors may be formed separately from the flat sheet material and may be made of the same or different materials. Typically, however, the unconnected tank compartment anchors are made of the same materials as the flat sheet materials (with perhaps, the exception of the caps or closures), and may be integrally formed therewith. This could be accomplished in a continuous process of layered materials positioned in predetermined locations and heat-sealed to a main sheet material. The layered materials would be precut and/or preformed with a threaded or fixed cap-receiving orifice, and heat-sealed to the flat sheet material to create a tank compartment anchor.

Obviously, numerous modification and variations of the present invention are possible in light of the above teachings. It is therefore understood that within the scope of the appended claims, the invention may be practiced otherwise than as specifically described herein.

What is claimed is:

1. A protective tarp for covering a mass, which consists of:
a flat, flexible sheet material having a top and bottom and having a peripheral edge; and,
a plurality of unconnected tank compartment anchors permanently attached to said flat, flexible sheet material and being separate and apart from one another and said peripheral edge, each of said plurality of tank component anchors having at least one fill orifice and having closure means for said at least one fill orifice and being arranged in a predetermined pattern, wherein said plurality of unconnected tank compartment anchors are hollow, flexible tank compartment anchors; and,
wherein said plurality of unconnected tank compartment anchors and said sheet material are formed of the same material.

2. The protective tarp of claim 1 wherein said sheet material is rectangular from a top view and has four edges, said edges being two sets of two opposite edges.

3. The protective tarp of claim 2 wherein there are at least two edges opposite one another which contain a plurality of tank compartment anchors.

4. The protective tarp of claim 1 wherein said protective tarp is a continuous tarp of substantial predetermined length having a central area away from said edges, and having a plurality of central tank compartment anchors located at said central area.

5. The protective tarp of claim 4 wherein said central tank compartment anchors are aligned in a row at a right angle to an edge.

6. The protective tarp of claim 5 wherein there are a plurality of groups of central tank compartment anchors, each group being located at said central area at disparate sections of said central area.

7. The protective tarp of claim 6 wherein each group of said plurality of permanently attached to groups of central tank compartment anchors are located equidistant said flat flexible sheet material from one another.

8. The protective tarp of claim 6 wherein at least a portion of said central tank compartment anchors are arranged in pairs so that said tarp may be divided between said pairs to create multiple tarps with tank compartment anchors along edges thereof.

9. The protective tarp of claim 4 wherein said sheet material is rectangular from a top view and has four edges, said edges being two sets of two opposite edges.

10. The protective tarp of claim 9 wherein there are at least two edges opposite one another which contain a plurality of tank compartment anchors.

11. A protective tarp for covering a mass, which consists of:
a flat, flexible waterproof sheet material having a top and a bottom and having a plurality of non-adjacent edges;
along each of at least two of said plurality of non-adjacent edges, a plurality of unconnected tank compartment anchors attached to said flat, flexible waterproof sheet material and being separate and apart from one another, each having at least one fill orifice and having closure means for said at least one fill orifice and being arranged in a predetermined pattern, wherein each of said plurality of unconnected tank compartment anchors is a hollow, flexible tank compartment anchor and,
wherein said plurality of unconnected tank compartment anchors and said sheet material are formed of the same material.

12. The protective tarp of claim 11 wherein said sheet material is rectangular from top view and has four edges, said four edges being two sets of two opposite edges.

13. The protective tarp of claim 12 wherein there are at least two edges opposite one another which contain a plurality of tank compartment anchors.

14. The protective tarp of claim 11 wherein said protective tarp is a continuous tarp of substantial predetermined length having a central area away from said edges, and having a plurality of central tank compartment anchors located at said central area.

15. The protective tarp of claim 14 wherein said central tank compartment anchors are aligned in a row at a right angle to an edge.

16. The protective tarp of claim 15 wherein there are plurality of groups of central tank compartment anchors, each group being located at said central are at disparate sections of said central area.

17. The protective tarp of claim 16 wherein each group of said plurality of groups of central tank compartment anchors is located equidistant from one another.

18. The protective tarp of claim 16 wherein at least portion of said central tank compartment anchors are arranged in pairs so that said tarp may be cut between said pairs to create multiple tarps with tank compartment anchors along all edges thereof.

19. The protective tarp of claim 14 wherein said sheet material is rectangular from a top view and has four edges, said edges being two sets of two opposite edges.

20. The protective tarp of claim 19 wherein there are at least two edges opposite one another which contain a plurality of tank compartment anchors.

* * * * *